Figure 10:
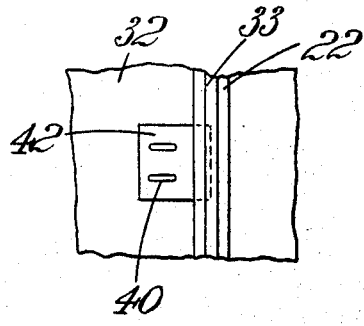

Oct. 28, 1958 C. W. G. ALLEN 2,857,662
METHODS OF MANUFACTURING METAL STRUCTURES
Filed July 13, 1953 2 Sheets-Sheet 1
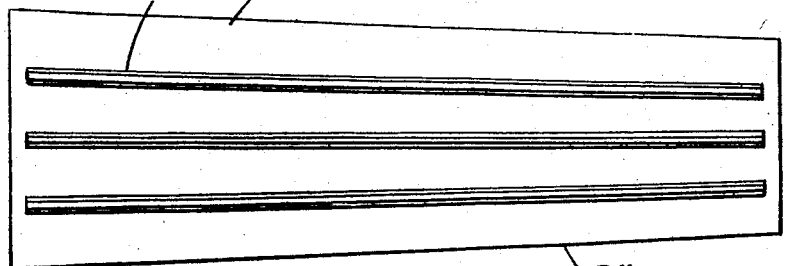
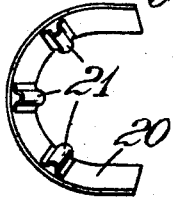
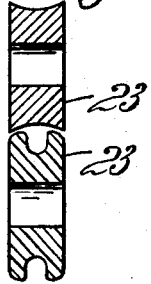
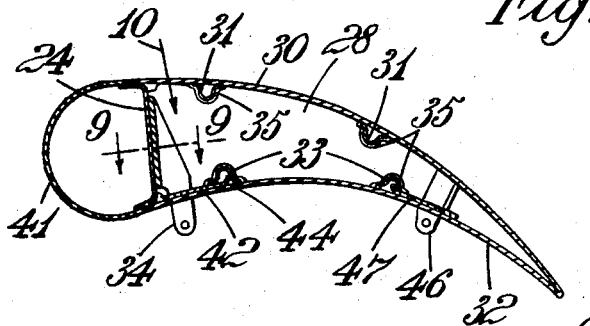
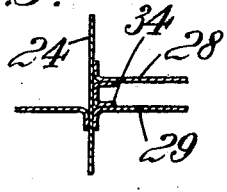
INVENTOR
C. W. G. ALLEN
BY Wilkinson & Mawhinney
ATTYS.

INVENTOR
C. W. G. ALLEN

United States Patent Office 2,857,662
Patented Oct. 28, 1958

2,857,662

METHODS OF MANUFACTURING METAL STRUCTURES

Charles William Grainger Allen, Bristol, England, assignor, by mesne assignments, to Bristol Aircraft Limited, Bristol, England, a British company Application July 13, 1953, Serial No. 367,703

4 Claims. (Cl. 29—449)

This invention relates to methods of manufacturing metal structures and concerns more particularly the manufacture of aircraft aerofoils and fuselage components.

Structures such as aircraft aerofoils and fuselages usually comprise a skin supported by structural members in the form of spaced stringers or stiffeners attached to the skin by flanges or the like having a surface contiguous with that of the skin. Where the skin is of single curvature shape and the run of the stiffeners is along straight generating lines of the surface it is frequently possible and convenient to attach the stiffeners to the skin while the latter is in a flat or flattened state and then to bend the assembly to the curvature required. Such a method of construction is particularly convenient when the stiffeners are bonded to the skin by means of a thermosetting material since the assembly can then be set up on a flat platen or on one of a standard curvature and the necessary pressure and heating are more easily applied. The same platen can moreover be used for a variety of finished shapes. This method has the drawback, however, that when the skin is bent to the final shape after attaching the stiffeners it does not take up a smooth curvature but tends to form knuckle lines at the edges of the stiffeners. Similar defects occur where other structural members such as doublings are attached to the skin.

The object of the present invention is to avoid or at least reduce these defects by suitable treatment of some or all of the parts before they are attached to one another. The invention is also applicable to assemblies in which a stiffener or the like extends in the direction of curvature, provided this curvature is not too great.

Broadly, the present invention provides a method of forming an assembly comprising, in its finished state, a single curvature skin and at least one structural member comprising a sheet material part which is contiguous with, and bonded to, a surface of the skin by means of a thermosetting material, which method comprises the steps of imparting to said sheet material part of the structural member a curvature so that, when it is unstressed, it is curved in the sense in which it will be curved in the finished assembly, and then bonding said pre-curved sheet material part to the skin while both are held, by applied pressure, in a flat condition, or in a more flattened condition than that to which they will conform in the finished assembly.

More particularly, the present invention provides a method of forming an aircraft aerofoil or fuselage component comprising, in its finished state, a single curvautre metal skin and metal structural members comprising flanges which are contiguous with, and bonded to a surface of, the skin, the structural members running substantially along straight generating lines of said surface, which method comprises the steps of imparting to said flanges a curvature such that, when they are unstressed, they are curved in the sense in which they will be curved in the finished aerofoil or fuselage component, bonding the pre-curved flanges to the skin while the flanges and the skin are held by applied pressure in a flat condition, and then bending the assembly to the finished curvature required.

According to a feature of the present invention the method may further comprise pre-curving the skin such that, when it is unstressed, it is curved in the sense of its finished curvature, before bonding it to said structural member or members. Inasmuch as the thickness of the skin is usually less than that of the attached structural members, however, the improvement resulting from providing pre-curvature in the skin is usually less marked.

Preferably, in carrying out the method the pre-curved parts are curved to an extent not greater than would produce stresses in said parts substantially in excess of the elastic limit of the material forming said parts when said parts are flattened to the shape at which the bonding is effected.

During the bonding process it is practically inevitable, however, that a certain amount of curvature of the pre-curved parts will be lost, and according to a feature of the present invention a curvature is imparted to said pre-curved parts in excess of that required for them in the finished assembly, the excess of curvature being such that after the parts have been flattened during the bonding process and released from the bonding pressure, they take up a curvature approximating to that required for them in the finished assembly.

Where the amount of preliminary curvature necessary to achieve this is in excess of that which can be pressed flat without exceeding the elastic limit of the material, the bonding process can be carried out on a curved platen, but in most cases the use of a flat platen gives sufficiently good results in practice even where some additional bending of the skin is required.

Figure 11:
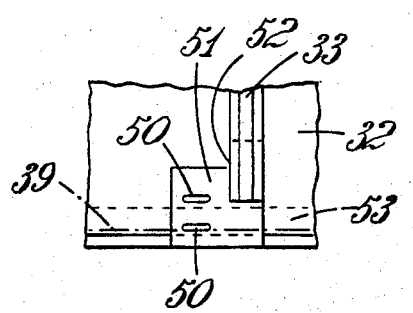
Figure 12:
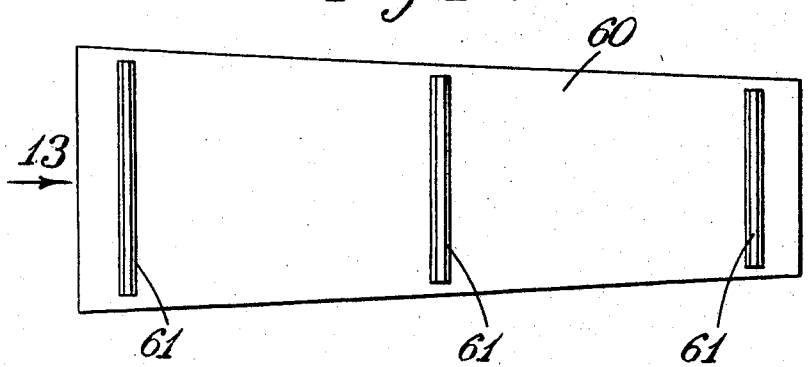
Figure 13:
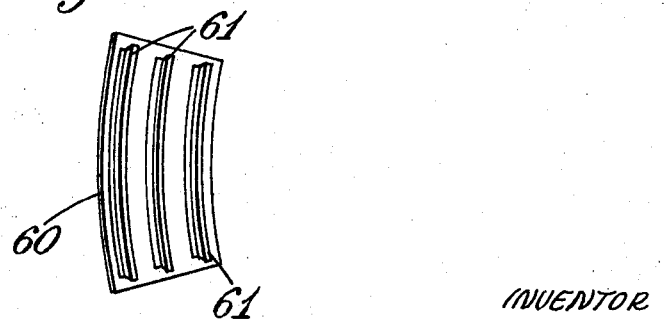

The present invention will now be further described, by way of example, firstly as applied to the manufacture of a leading edge portion of an aircraft wing flap, secondly as applied to the manufacture of an aircraft wing slat; and thirdly as applied to the trailing edge portion of an aircraft wing flap. These descriptions will be given with reference to the accompanying drawings in which:

Figure 1 shows in cross-section a metal structural member in a form in which it is usually produced prior to bonding to a metal skin, Figures 2 and 3 show, in cross section, metal structural members which have been pre-curved in accordance with the present invention, Figures 4 and 5 show, in cross-section, rolls suitable for pre-curving the structural members shown in Figures 2 and 3 respectively, Figure 6 shows in front elevation a metal skin to which structural members have been bonded prior to bending to the shape required for the leading edge portion of an aircraft wing flap, Figure 7 shows, in end elevation, the skin of Figure 6, after it has been bent to the shape required for the leading edge portion of an aircraft wing flap, Figure 8 shows, in cross-section, the wing slat manufactured in accordance with the present invention, Figure 9 is a partial view of the wing slat, in cross-section along line 9—9 of Figure 8, Figure 10 is a partial view of the skin of the wing slat shown in Figure 8 in the direction of arrow 10, Figure 11 is a partial view of an end part of the wing slat shown in Figure 8, Figure 12 shows in front elevation the upper part of a trailing edge portion of an aircraft wing flap produced by a method in accordance with the present invention, and Figure 13 is a view in the direction of arrow 13 of Figure 12.

The finished assembly of skin material 20 and structural members 21 forming the leading edge portion of an aircraft wing flap is shown in Figure 7. In the example now being described, the thickness of the flap tapers from about 8 inches at its inboard end to about 6 inches at its outboard end, so that the radius of curvature of the leading edge portion varies from about 4 inches to 3 inches. The skin material 20 is of metal about 0.018 inch thick and is stiffened by the structural members 21 which comprise three metal "top-hat" section stringers spaced apart and running spanwise of the leading edge portion, that is, substantially along straight generating lines of the surface of the skin material 20 to which they are attached. The stringers are of a rounded "top-hat" section as shown in Figures 1, 2 and 3, and are made from metal about 0.022 inch thick with flanges 22 about 0.5 inch wide.

To begin with the stringers are produced with a section as shown in Figure 1. This is the form in which the stringers have heretofore been rolled prior to bonding to the skin material by the method described in the opening paragraphs of the specification, that is, with a flat base.

In carrying out the method in accordance with the present invention, the stringers of Figure 1 are, prior to bonding with the skin material 20, passed through a pair of rolls 23 having a cross-section such as is shown in Figure 4 which, in the particular example being described, have a transverse radius of curvature of 2 inches. The rolls 23 impart to the flanges 22 of the stringers a curvature such that when the flanges 22 are unstressed, that is, have proceeded through the nips between the rolls, the flanges 22 are curved in the sense in which they are required to be curved in the finished assembly shown in Figure 7. The stringers, after having been passed through the rolls 23, accordingly have a cross-section as shown in Figure 2.

The pre-curved stringers are then bonded to the skin 20 with a thermosetting material such as a synthetic thermosetting resin, the bonding being carried out in a press on a flat platen at a temperature sufficient to cure the resin, and under an applied pressure of about 100 lbs./sq. inch, which pressure is applied to the upper surfaces of the flanges 22, and is sufficient to flatten the flanges against the skin material, which in the example being described is substantially flat at this stage.

When the assembly is taken from the press it is found that a pronounced curvature of the skin material 20 is visible, the curvature running in bands following the lines of the stringers, the intermediate skin portions being, of course, in the present example, flexible owing to their small thickness.

The assembly is then bent to its required curvature, as shown in Figure 7, by means of a jig comprising closely spaced wooden formers. One long edge, for example 25, of the assembly is anchored, by suitable means, in correct relation to the formers, and the assembly is then gradually drawn round the formers by spaced bands of fabric.

Any required trimming of the edges is then carried out, and the assembly is finally removed and taken to an erecting jig where it is attached to other components of the wing flap.

It desired, the skin material 20 may, prior to the bonding process, be pre-curved by rolling the skin such that when it is unstressed it is curved in the sense of its finished curvature as shown in Figure 7. If this is done, however, the pre-curving should not be greater than can conveniently be flattened during the bonding process.

Preferably, the pre-curved flanges 22 and the skin material 20, if it is pre-curved, are pre-curved to an extent not greater than would produce stresses in their material substantially in excess of the elastic limit of the material when the flanges and the skin are flattened during the bonding process. The flanges 22 may be pre-curved to such an extent that after the bonding process their curvature is that required in the finished assembly. If, in this case, the pre-curvature required is such that the elastic limit of the material forming the flanges would be substantially exceeded should the flanges be entirely flattened during the bonding process the skin and the stringers may be bonded on a curved platen so that the flattening of the flanges during the bonding process is less marked, and the elastic limit of the material making up the flanges is not substantially exceeded.

The second example of the present invention as applied to the manufacture of the wing slat shown in Figure 8, will now be described. Referring to Figure 8, the wing slat is made up of a convex metal skin part 30 stiffened by two spanwise metal stringers 31, a concave metal skin part 32 stiffened by two spanwise metal stringers 33, a metal leading edge part 41, a metal spar member 24, and metal rib members such as 28, 29 (see Figure 9), which are cut away as at 35 to allow the passage of the stringers 31 and 33.

The skin part 30 is produced as previously described with reference to Figure 7, the flanges 22 of the stringers 31 being pre-curved as shown in Figure 2.

The skin part 32 is produced as previously described with reference to Figure 7, except that the stringers 33 are pre-curved by passing them through rolls having a cross-section as shown in Figure 5, so that when the flanges 22 of the stringers are unstressed they are curved in the sense in which they are curved in the finished skin part 32 as shown in Figure 3.

Referring to Figure 9, an operating lever 34 made from channel section material has its web riveted, during the final assembly, to the spar member 24, and its flanges to the ribs 28, 29. The twin arms of the lever 34 project through slots 40 in the skin 32 (see Figure 10). The slots 40 are reinforced by the adjacent stringer 33, and by a doubling 42 which, like the stringers, is bonded to the skin 32 with a thermosetting material. The doubling 42 is rolled, prior to bonding to the skin 32 to impart to it an excess of curvature in the sense in which it is curved in the final assembly so that after it has been flattened during the bonding process it takes up a curvature substantially that required for it in the final assembly. The doubling 42 extends under one flange 22 of the adjacent stringer 33 as shown in Figure 10, the flange being suitably joggled to accommodate the doubling, the edge of the doubling 42 lying within the "hump" of the stringer being bent as at 44 away from the skin 32 (see Figure 8) so as to avoid a sharp edge which might produce a knuckle line in the skin.

A somewhat similar lever 46 (see Figure 8) is provided near the trailing edge of the slat, the lever being likewise riveted between the ribs 28, 29 during the final assembly, the double prong of the lever passing through holes in the skin 32 which are reinforced by a doubling 47 which is pre-curved and bonded to the skin 32 as previously described with reference to the doubling 42. Also, as previously described with reference to the doubling 42, the doubling 47 passes under a joggled portion of the flange 22 of the adjacent stringer and has its edge lying within the hump of the stringer bent away from the skin 32 to prevent the formation of a knuckle line.

Another pair of levers similar to levers 34 and 46 are provided at one end of the slat the levers being riveted to the end rib of the slat, and having double prongs passing through slots in the skin 32. Figure 11 shows an end portion of the skin 32 provided with slots 50 for one of these levers. It will be noted that the stringers 33 are stopped short of the end edge of the slat, and in this case the slots 50 are reinforced by a doubling 51 which has an extension 52 underlying the end of a stringer 33 where the doubling passes the end of the stringer, the stringer being joggled to accommodate the extension. The doubling 51 is pre-curved, and bonded to the skin 32 by means of thermosetting material with the stringer 33, as previously described with reference to the doubling 42.

To finish off the end of the slat, part of which is shown in Figure 11, a flanged end rib 53 is added during the final assembly to close the end of the slat. Before this, however, the skins 30, 32 and the leading edge portion 41 are trimmed, the skin 32 being trimmed along the chain dotted line 39, so that what was the outer hole 50 forms a notch in the edge of the component.

The present invention may also be applied to the manufacture of components of small curvature having structural members running in the direction of curvature of the skin material. The upper part of a trailing edge portion of an aircraft wing flap shown in Figures 12 and 13 is constructed in this manner. The upper part comprises a metal skin 60 to which is bonded, by means of a thermosetting material, three chordwise extending 'top-hat" section metal stiffeners 61. The stiffeners 61 are pre-curved, prior to the bonding process, in the sense in which they are required to be curved in the finished trailing edge portion part and are then bonded to the skin while flattened in a press as previously described with reference to the production of the leading edge portion of a wing flap shown in Figure 7. The pre-curving imparted to the stiffeners 61 is in excess of that required for them in the finished assembly, and is such, that after flattening in the press, the curvature remaining in them is substantially that required for them in the finished assembly.

If the excess of curvature necessary is such as to preclude the complete flattening of the stiffeners 61, if the elastic limit of the material of the stiffeners is not to be substantially exceeded during the bonding process, the skin 60 may be laid on a curved platen during the bonding process so that the flattening of the stiffeners during the bonding process is not so marked, and the elastic limit of the material forming the stringers not substantially exceeded.

I claim:

1. A method of forming an assembly comprising a single curvature skin, structure serving primarily to retain the skin in its required curvature, and at least one other member serving primarily to stiffen the skin, said other member comprising a sheet material part which is contiguous with and bonded to a surface of the skin by means of thermosetting material, which method comprises the steps of giving said sheet material part of said other member a permanent set curvature substantially that of its final shape, supporting said skin, placing said other member in required relation upon said skin with the interposition of a layer of thermosetting bonding material, pressing said sheet material part onto said skin so as at least partially to flatten said sheet material part and to effect bonding between said sheet material part and said skin, and then attaching the bonded skin-member assemblage to said structure serving to retain the skin in its required curvature.

2. A method as claimed in claim 1, comprising giving to the skin a permanent set curvature substantially that of its final shape before bonding said sheet material part to the skin, and pressing said sheet material part onto said skin so as at least partially to flatten both said sheet material part and said skin and to effect bonding between said sheet material part and said skin.

3. A method as claimed in claim 1, comprising giving said sheet material part a permanent set curvature in excess of that required for it in the finished assembly whereby after the sheet material part has been flattened during the bonding step and released from the bonding pressure it takes up a curvature approximating to that required for it in the finished assembly.

4. A method as claimed in claim 1, comprising pressing said sheet material part on to said skin so as to flatten the sheet material part and bond it to the skin.

References Cited in the file of this patent

UNITED STATES PATENTS

| | | |
|---|---|---|
| 1,760,332 | Wibault | May 27, 1930 |
| 1,842,736 | Stout | Jan. 26, 1932 |
| 2,314,978 | Gunn | Mar. 30, 1943 |
| 2,364,494 | Upson | Dec. 5, 1944 |
| 2,386,018 | Watter | Oct. 2, 1945 |
| 2,387,219 | Wallis | Oct. 16, 1945 |
| 2,390,761 | Watter | Dec. 11, 1945 |
| 2,441,858 | Watter | May 18, 1948 |
| 2,620,552 | Jenkins | Dec. 9, 1952 |

FOREIGN PATENTS

| | | |
|---|---|---|
| 625,778 | Great Britain | July 4, 1949 |

UNITED STATES PATENT OFFICE

CERTIFICATE OF CORRECTION

Patent No. 2,857,662                             October 28, 1958

Charles William Grainger Allen

It is hereby certified that error appears in the above numbered patent requiring correction and that the said Letters Patent should read as corrected below.

In the heading to the printed specification, between lines 7 and 8, insert -- Claims priority, application Great Britain July 28, 1952 --.

Signed and sealed this 21st day of April 1959.

(SEAL)

Attest:

KARL H. AXLINE
Attesting Officer

ROBERT C. WATSON
Commissioner of Patents